US009321692B2

(12) United States Patent
Koucouthakis et al.

(10) Patent No.: US 9,321,692 B2
(45) Date of Patent: Apr. 26, 2016

(54) RAPID SYNTHESIS OF SILICON CARBIDE-CARBON COMPOSITES

(75) Inventors: Manuel Koucouthakis, Granger, IN (US); Douglas J. Steinke, South Bend, IN (US); Alexander Mukasyan, Granger, IN (US); Jeremiah D. E. White, South Bend, IN (US)

(73) Assignees: Honeywell International Inc., Morris Plains, NJ (US); The University of Notre Dame du Lac, Notre Dame, IN (US)

( * ) Notice: Subject to any disclaimer, the term of this patent is extended or adjusted under 35 U.S.C. 154(b) by 1953 days.

(21) Appl. No.: 12/533,706

(22) Filed: Jul. 31, 2009

(65) Prior Publication Data

US 2010/0032286 A1 Feb. 11, 2010

Related U.S. Application Data

(60) Provisional application No. 61/136,011, filed on Aug. 6, 2008.

(51) Int. Cl.
| | |
|---|---|
| *C04B 35/573* | (2006.01) |
| *C04B 35/645* | (2006.01) |
| *C04B 35/80* | (2006.01) |
| *F16D 69/02* | (2006.01) |

(52) U.S. Cl.
CPC ............. *C04B 35/573* (2013.01); *C04B 35/645* (2013.01); *C04B 35/806* (2013.01); *F16D 69/023* (2013.01); *C04B 2235/428* (2013.01); *C04B 2235/5252* (2013.01); *C04B 2235/5256* (2013.01); *C04B 2235/5427* (2013.01); *C04B 2235/5436* (2013.01); *C04B 2235/666* (2013.01); *F16D 2200/0047* (2013.01)

(58) Field of Classification Search
USPC ........................................................ 264/682
See application file for complete search history.

(56) References Cited

U.S. PATENT DOCUMENTS

| | | | |
|---|---|---|---|
| 1,013,700 A | 1/1912 | Tone | |
| 2,431,326 A | 11/1947 | Heyroth | |
| 4,276,275 A * | 6/1981 | Ando et al. | ................... 423/345 |
| 4,837,073 A | 6/1989 | McAllister et al. | |

(Continued)

OTHER PUBLICATIONS

Mukasyan et al.; "Electrically Induced Liquid Infiltration for the Synthesis of Carbon/Carbon-Silicon Carbide Composite"; Ceramics International; Jun. 21, 2009; pp. 3291-3299; vol. 35.

(Continued)

*Primary Examiner* — Russell Kemmerle, III
(74) *Attorney, Agent, or Firm* — Shumaker & Sieffert, P.A.

(57) ABSTRACT

Production of pore-free carbon/carbon-silicon carbide composite materials with mechanical properties making them suitable for use in such applications as the production of aircraft landing system brake components including brake discs. The method includes: providing a porous carbon-carbon composite preform; surrounding the porous carbon-carbon composite preform with silicon powder to form an intermediate construct; applying a uniaxial load to the construct; applying direct electrical current to an assembly containing the loaded construct of porous carbon-carbon preform surrounded by silicon powder, thereby melting the silicon powder and infiltrating the pores of the carbon-carbon preform with liquid silicon; and initiating a combustion-type reaction between the silicon and carbon in the preform, thereby forming silicon carbide in the preform.

11 Claims, 2 Drawing Sheets

(56) References Cited

U.S. PATENT DOCUMENTS

| | | | |
|---|---|---|---|
| 5,733,352 A * | 3/1998 | Ogawa et al. | 55/523 |
| 6,110,535 A | 8/2000 | Rey et al. | |
| 6,503,441 B2 * | 1/2003 | Corman et al. | 264/635 |
| 6,555,173 B1 | 4/2003 | Forsythe et al. | |
| 6,756,121 B2 | 6/2004 | Forsythe et al. | |
| 7,029,613 B2 * | 4/2006 | Wan et al. | 264/123 |
| 7,128,850 B2 * | 10/2006 | Duan et al. | 252/518.1 |
| 2004/0057861 A1 | 3/2004 | Zhu et al. | |
| 2004/0179969 A1 * | 9/2004 | Wan et al. | 419/13 |
| 2004/0238795 A1 * | 12/2004 | Duan et al. | 252/500 |
| 2007/0175535 A1 * | 8/2007 | Kostar et al. | 139/387 R |
| 2007/0235123 A1 | 10/2007 | Simpson et al. | |
| 2007/0235126 A1 | 10/2007 | Simpson et al. | |
| 2008/0283174 A1 | 11/2008 | Simpson et al. | |

OTHER PUBLICATIONS

Merzhanov et al.; "Macrokinetics of Structural Transformation During the Gasless Combustion of a Titanium and Carbon Powder Mixture," Combust. Explo. Shock, vol. 26(1), pp. 104-114 (1990).

White et al., "Novel Apparatus for Joining of Carbon-Carbon Composites", Rev. Sci. Instrum., vol. 78, pp. 015105-1 to 015105-5 (2007).

Examination Report dated Jan. 30, 2013, for counterpart EP Application No. 09 167 122.2, 4 pages.

Response to Examination Report dated Jan. 30, 2012, for counterpart European application No. 09167122.2, filed May 23, 2013, 4 pp.

* cited by examiner

256
RAPID SYNTHESIS OF SILICON CARBIDE-CARBON COMPOSITES

CROSS-REFERENCE TO RELATED APPLICATION

This application claims priority under 35 U.S.C. §119(e) to U.S. provisional application Ser. No. 61/136,011, which was filed on Aug. 6, 2008.

FIELD OF THE INVENTION

This invention relates to silicon carbide-carbon composites, such as those used in aerospace braking applications, and more particularly to a method and apparatus for synthesizing silicon carbide-carbon composites.

BACKGROUND OF THE INVENTION

Silicon carbide-carbon-carbon (SiC-C/C) composites are an advanced class of materials typically used for aerospace and performance braking applications. Such composites exhibit increased resistance to wear and oxidation over alternatives. SiC-C/C is typically synthesized using chemical vapor infiltration, liquid silicon infiltration, or pyrolysis techniques, which require long treatment at high temperatures in order to form the composite material.

Such known methods for synthesizing SiC-C/C composites require long term (hours) high temperature materials treatment. In addition, under such conditions, the characteristic time of liquid silicon infiltration into the carbon porous skeleton is typically longer than the characteristic time of reaction between the melt and carbon material. As a result, pores on the sample periphery rapidly close, while the central part of the sample remains porous. Thus, the synthesized material exhibits a non-uniform microstructure.

U.S. Pat. No. 6,555,173 B1 describes an invention based, in part, on the recognition that treating a SiC-coated carbon-carbon composite with a phosphoric acid-based retardant solution significantly improves oxidative resistance at the higher end of the typical operating temperature range and in the presence of high concentration of known oxidation catalysts.

SUMMARY OF THE INVENTION

The present invention provides an electrically assisted liquid infiltration method for the synthesis of carbon/carbon-silicon carbide composite materials. The process of this invention is characterized by high heating rates ($10^2$-$10^3$ K/s) and short treatment times (10 to 100 seconds). The present method enables the production of pore-free carbon/carbon-silicon carbide composite materials with mechanical properties that make them appropriate for use in such applications as the production of aircraft landing system brake components such as brake discs.

More particularly, this invention provides a method of synthesizing silicon carbide-carbon composites which includes the steps of: providing a porous carbon-carbon composite preform; surrounding the porous carbon-carbon composite preform with silicon powder (the particle size of the Si is typically less than 100 mesh or 149 microns) to form an intermediate construct; and applying a uniaxial load (e.g., ranging from 50 $lb_f$ to 1000 $lb_f$) to the construct. At this point, one applies direct electrical current to an assembly containing the loaded construct of porous carbon-carbon preform surrounded by silicon powder, thereby melting the silicon powder and infiltrating the pores of the carbon-carbon preform with liquid silicon. The current applied may be a direct current of 100 to 1000 amps (often, a current of 300-600 amps), applied for from 10 to 100 seconds (often, for 30-70 seconds). This initiates a combustion-type reaction between the silicon and carbon in the preform, thereby forming silicon carbide in the preform.

BRIEF DESCRIPTION OF THE DRAWINGS

A more complete understanding of the present invention will become apparent from the following description taken in conjunction with the accompanying drawings, which are given by way of illustration only and are not limitative of the present invention.

DETAILED DESCRIPTION OF THE INVENTION

In one aspect, the present invention is a method of synthesizing silicon carbide-carbon/carbon composites. Generally, an embodiment of the present invention employs a rapid (e.g., seconds) electrically assisted combustion-based technique to synthesize a SiC-C/C composite. This technique overcomes the aforementioned shortcomings of known methods by allowing a silicon melt to rapidly infiltrate into the carbon skeleton followed by the reaction between silicon and carbon.

Figure 2:
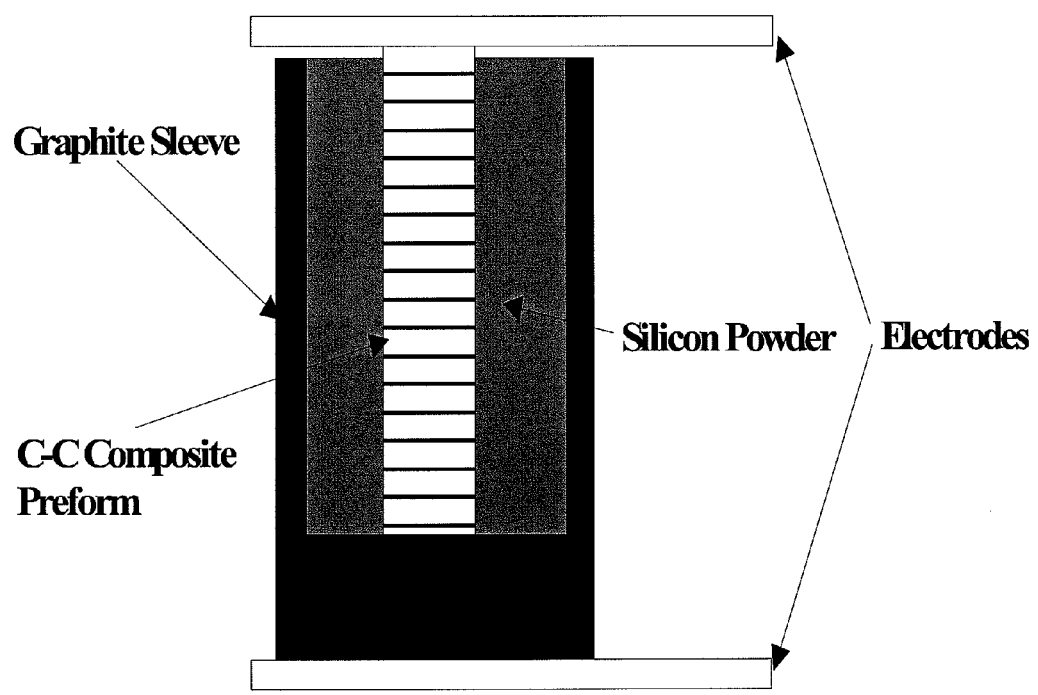
FIG. 2 illustrates a scheme of apparatus for synthesizing silicon carbide-carbon composites according to an embodiment of the present invention.

FIG. 2 illustrates an apparatus for synthesizing silicon carbide-carbon/carbon composites in accordance with an embodiment of the present invention. As seen in FIG. 2, the apparatus for synthesizing silicon carbide-carbon/carbon in accordance with this embodiment includes a graphite sleeve and electrodes positioned above and below the graphite sleeve. Typical dimensions for the graphite sleeve could be an inner diameter of 18 mm and an outer diameter of 25 mm, although any suitable size graphite sleeve can be employed. A porous carbon-carbon (C/C) composite preform, for example having an annular shape, is positioned within the graphite sleeve and surrounded by silicon powder. The entire sleeve assembly (with the C/C preform and silicon powder contained therein) is placed between the two electrodes. Then, direct current (e.g., 300 to 600 amps) is passed through the C/C perform, causing heat to build up due to the electrical resistance of the material. As the temperature rises rapidly (e.g., 3 to 7 seconds) to the melting point (1410° C.) of the surrounding silicon powder, the silicon melts and —due to capillary forces—rapidly infiltrates into the skeleton of the porous C/C composite preform. This process is followed by a combustion-type reaction between liquid silicon and carbon, forming silicon carbide in the initial pore structure.

The apparatus includes a pneumatic system (not shown) which applies a uniaxial load to the sample. Operational parameters such as initial pressure and final pressure, applied current, delay time before final pressure application, and so on are defined with a programmable logic controller system. Temperature is sensed with a thermocouple or an optical system.

In the process of the present invention, the C/C skeleton is rapidly preheated to temperatures much higher than that of liquid silicon. This would not be the case when, for instance, one immerses a porous composite into a crucible of liquid silicon. In this invention, the preheating time is very short, on the order of a second. If one were to preheat a similar C/C—Si system in an oven or furnace, the available open pore structure could become closed before infiltration is complete, due to solid-solid interactions between carbon and silicon. It is manifest that rapid electrical resistance heating provided by the present invention results in significant improvement in the penetration of liquid silicon into the C/C pore structure.

Figure 1:
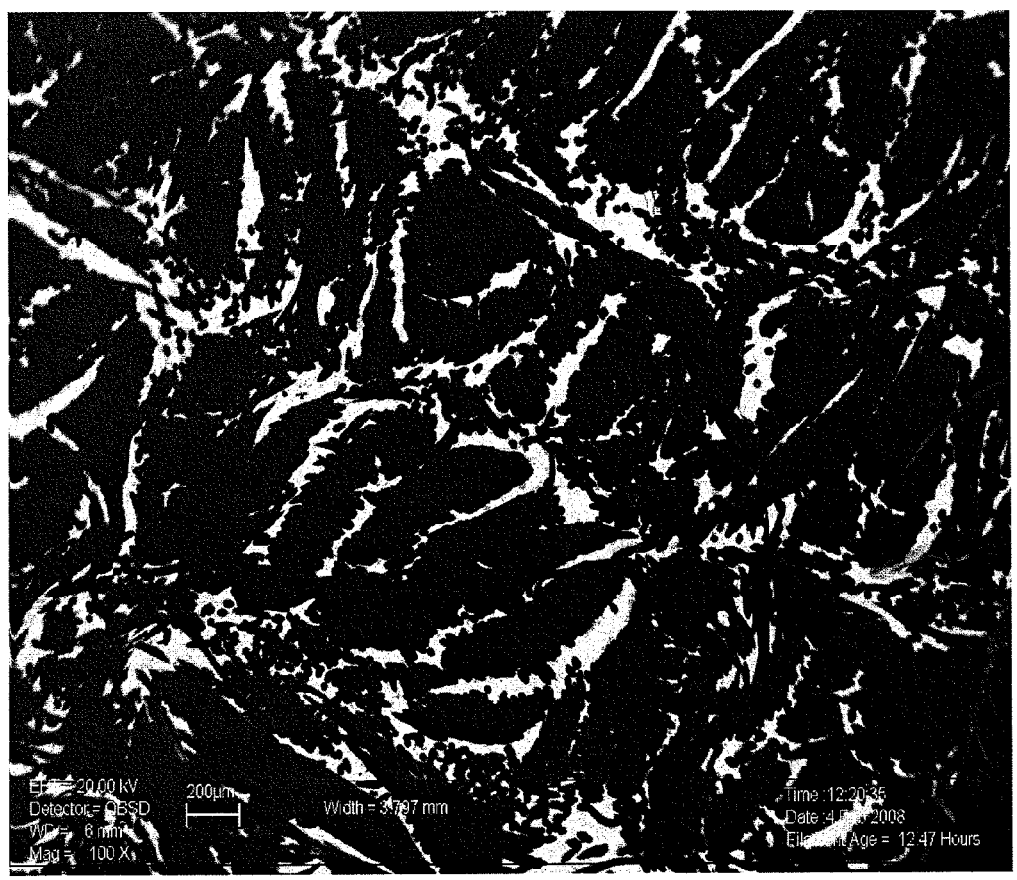
FIG. 1 illustrates a uniform microstructure of a synthesized silicon carbide-carbon composite achieved in accordance with an implementation of the present invention.

FIG. 1 illustrates a uniform microstructure of the synthesized composite achieved by implementing an embodiment of the present invention. FIG. 1 was obtained from a scanning electron microscope in backscattering mode. The sample in FIG. 1 was subjected to 10 seconds of heat treatment at 2125° K.

EXAMPLES

Tables 1-3 illustrate, by way of example, experiments conducted to determine preferred conditions for synthesizing SiC-C/C in accordance embodiments of the present invention. These experiments are conducted using a preform sample size of 1 cm diameter and 3 cm height. The preform is a prefabricated carbon/carbon composite supplied by Honeywell International Inc. of South Bend, Ind. Layers of a felt-like carbon fiber material are stitched together into an annular shape, forming a preform with high initial porosity (about 75%). The preform is placed in a furnace where it is treated at high temperature in the presence of natural gas, during which additional carbon enters the pore structure by chemical vapor infiltration (CVI). After processing in this way, the C/C composite structure is composed of carbon fibers within a CVI-carbon matrix. The density of the preform is about 2.0 g/cm$^3$. Total open porosity at this stage is approximately 15%. The specimens used for the testing are cut from a larger piece to convenient size. The silicon is 99% purity −325 mesh silicon powder from Strem Chemicals of Newburyport, Mass.

The experiments reflected in Table 1 used an initial pressure of approximately 70 lb$_f$ at a total current running time of 5.0 seconds.

TABLE 1

| Sample | I (amps) | Si-before (grams) | C—C before (grams) | SiC—C/C after (grams) |
| --- | --- | --- | --- | --- |
| Si-600-5 | 600 | 0.250 | 2.900 | 3.104 |
| Si-500-5 | 500 | 0.242 | 2.897 | 3.092 |
| Si-400-5 | 400 | 0.239 | 2.859 | 3.012 |
| Si-300-5 | 300 | 0.239 | 2.877 | 2.886 |

Based on the results of the experiments reflected in Table 1, it was decided to use 500 A current and vary the duration and applied pressure as shown in Table 2 (varied duration) and Table 3 (varied pressure).

For the experiments reflected in Table 2, the same initial pressure (approximately 63 lb$_f$) was applied while varying the current duration: 1 second, 5 seconds, 10, seconds, 20 seconds.

TABLE 2

| Sample | I (amps) | Si-before (grams) | C—C before (grams) | SiC—C/C after (grams) |
| --- | --- | --- | --- | --- |
| Si-500-20 | 500 | 0.239 | 2.906 | 3.183 |
| Si-500-10 | 500 | 0.240 | 2.916 | 3.129 |
| Si-500-5 | 500 | 0.242 | 2.777 | 2.968 |
| Si-500-1 | 500 | 0.242 | 2.785 | 2.781 |

For the experiments reflected in Table 3, the pressure was varied: 63 lb$_f$; 150 lb$_f$; 300 lb$_f$; and 900 lb$_f$ with duration of 20 seconds

TABLE 3

| Sample | I (amps) | Si-before (grams) | C—C before (grams) | SiC—C/C after (grams) |
| --- | --- | --- | --- | --- |
| Si-500-63 | 500 | 0.236 | 2.894 | 3.093 |
| Si-500-150 | 500 | 0.244 | 2.885 | 3.105 |
| Si-500-300 | 500 | 0.224 | 2.869 | 3.091 |
| Si-500-900 | 500 | 0.243 | 2.883 | 3.091 |

It is shown that for tested configuration, the material with best properties may be obtained under following experimental conditions: current 500 A, applied load 300 lbf and synthesis duration 20 seconds. These values will vary for different preform specimen sizes.

While the present invention has been described with respect to detailed examples of its implementation, the invention is capable of numerous modifications, rearrangements, and alterations, and such are intended to be within the spirit and scope of the foregoing disclosure and the appended claims.

What is claimed is:

1. A method of synthesizing silicon carbide-carbon composites, the method comprising:
    applying a uniaxial load to an intermediate construct comprising a porous carbon-carbon composite preform surrounded by silicon powder;
    applying direct electrical current to an assembly comprising the loaded intermediate construct comprising the porous carbon-carbon composite preform surrounded by the silicon powder, thereby melting the silicon powder and infiltrating pores of the carbon-carbon composite preform with liquid silicon; and
    initiating a combustion-type reaction between the silicon and carbon in the preform, thereby forming silicon carbide in the preform.

2. The method of claim 1, wherein the direct electrical current is 100 amps to 1000 amps, and wherein applying direct electrical current to the assembly comprises applying the direct electrical current to the assembly for 10 seconds to 100 seconds.

3. The method of claim 2, wherein the direct electrical current is 300 amps to 600 amps, and wherein applying direct electrical current to the assembly comprises applying the direct electrical current to the assembly for 30 seconds to 70 seconds.

4. The method of claim 1, wherein the uniaxial load ranges from 50 lb$_f$ to 1000 lb$_f$.

5. The method of claim 1, wherein the silicon powder has a particle size of less than 100 mesh (149 microns).

6. The method of claim 1, further comprising, prior to applying the uniaxial load:
    positioning the carbon-carbon composite preform in a graphite sleeve; and
    surrounding the carbon-carbon composite preform with the silicon powder.

7. The method of claim 6, wherein applying direct electrical current to the assembly comprising the loaded intermediate construct comprising the porous carbon-carbon composite preform surrounded by the silicon powder comprises applying direct electrical current to the assembly via electrodes positioned on opposite sides of the graphite sleeve.

8. The method of claim 1, wherein applying direct electrical current to the assembly comprising the loaded intermediate construct comprising the porous carbon-carbon composite preform surrounded by the silicon powder comprises passing the direct electrical current through the carbon-carbon composite preform.

9. The method of claim 1, wherein applying direct electrical current to the assembly comprising the loaded intermediate construct comprising the porous carbon-carbon composite preform surrounded by the silicon powder comprises heating the intermediate construct at a rate of $10^2$ Kelvin per second (K/s) to $10^3$ K/s.

10. The method of claim 1, wherein applying the uniaxial load to the intermediate construct comprises applying the uniaxial load to the intermediate construct via a pneumatic system.

11. The method of claim 1, wherein the carbon-carbon composite preform has an annular shape.

* * * * *